(12) United States Patent
Heil et al.

(10) Patent No.: US 7,000,932 B2
(45) Date of Patent: Feb. 21, 2006

(54) AUTOMOTIVE VEHICLE POLYMERIC RUNNING BOARD

(75) Inventors: Phillip J. Heil, Harrow (CA); Janet M. Rawson, Livonia, MI (US)

(73) Assignee: Ventra Group Inc., Rochester Hills, MI (US)

( * ) Notice: Subject to any disclaimer, the term of this patent is extended or adjusted under 35 U.S.C. 154(b) by 0 days.

(21) Appl. No.: 10/000,210

(22) Filed: Nov. 2, 2001

(65) Prior Publication Data

US 2003/0085544 A1 May 8, 2003

(51) Int. Cl.
*B60R 3/00* (2006.01)

(52) U.S. Cl. ..................................... 280/163
(58) Field of Classification Search ................ 180/163, 180/164.1, 164.2, 166, 169; 182/127
See application file for complete search history.

(56) References Cited

U.S. PATENT DOCUMENTS

| 4,696,507 | A | * | 9/1987 | Alldredge ................... 296/37.6 |
| 5,022,679 | A | * | 6/1991 | Pazik ....................... 280/164.1 |
| 5,286,049 | A | | 2/1994 | Khan |
| 5,697,626 | A | | 12/1997 | McDaniel et al. |
| 5,769,439 | A | | 6/1998 | Thompson |
| 5,823,553 | A | | 10/1998 | Thompson |
| 6,045,912 | A | | 4/2000 | Taguchi |
| 6,050,579 | A | | 4/2000 | Selland et al. |
| 6,203,040 | B1 | | 3/2001 | Hutchins |
| 6,412,799 | B1 | * | 7/2002 | Schrempf ................... 280/163 |
| 6,513,821 | B1 | * | 2/2003 | Heil ......................... 280/163 |
| 2003/0006576 | A1 | * | 1/2003 | Lanoue et al. ............. 280/163 |

FOREIGN PATENT DOCUMENTS

| JP | 59-32535 | * | 2/1984 | ................ 280/166 |
| JP | 2-92786 | * | 4/1990 | ................ 280/163 |
| JP | 5-85267 | * | 4/1993 | ................ 280/169 |

* cited by examiner

*Primary Examiner*—Frank Vanaman
(74) *Attorney, Agent, or Firm*—Dykema Gossett PLLC

(57) ABSTRACT

A polymeric running board for an automotive vehicle is provided. The running board has a polymeric platform for supporting a vehicle occupant's foot during entry or exit of a lateral side door of the vehicle. The platform is connected to the vehicle by J-shaped support brackets which are co-molded therewith. The running board provided is advantageous over prior running boards in that it is lighter and easier to assemble, reducing assembly time and cost.

16 Claims, 3 Drawing Sheets

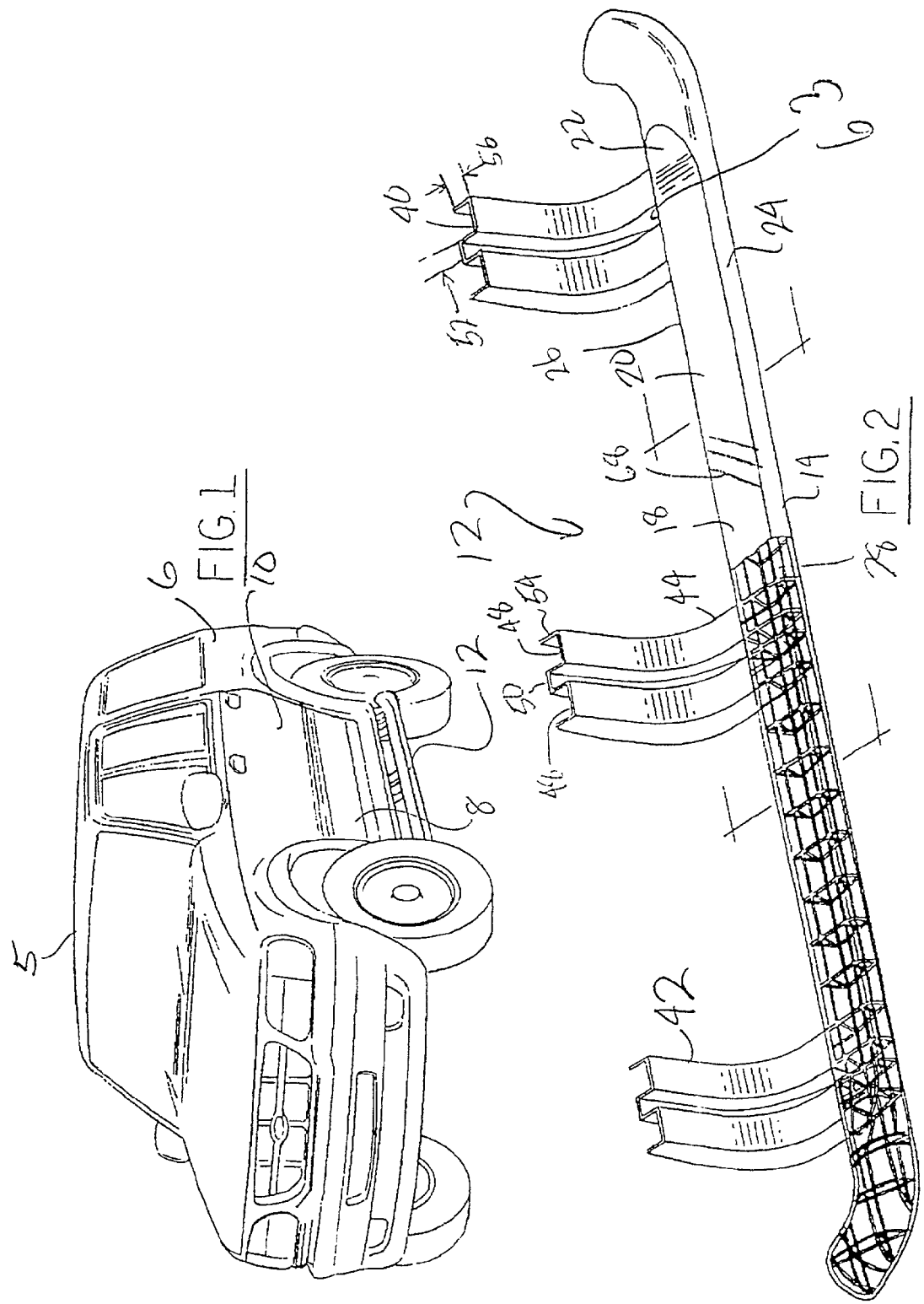

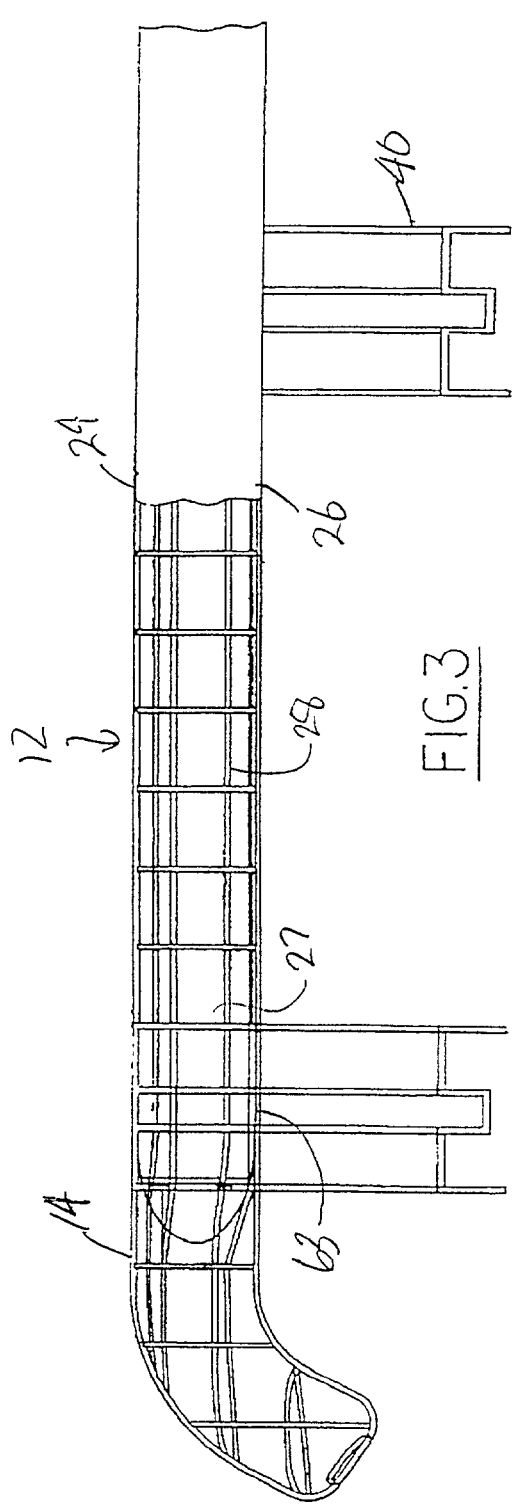
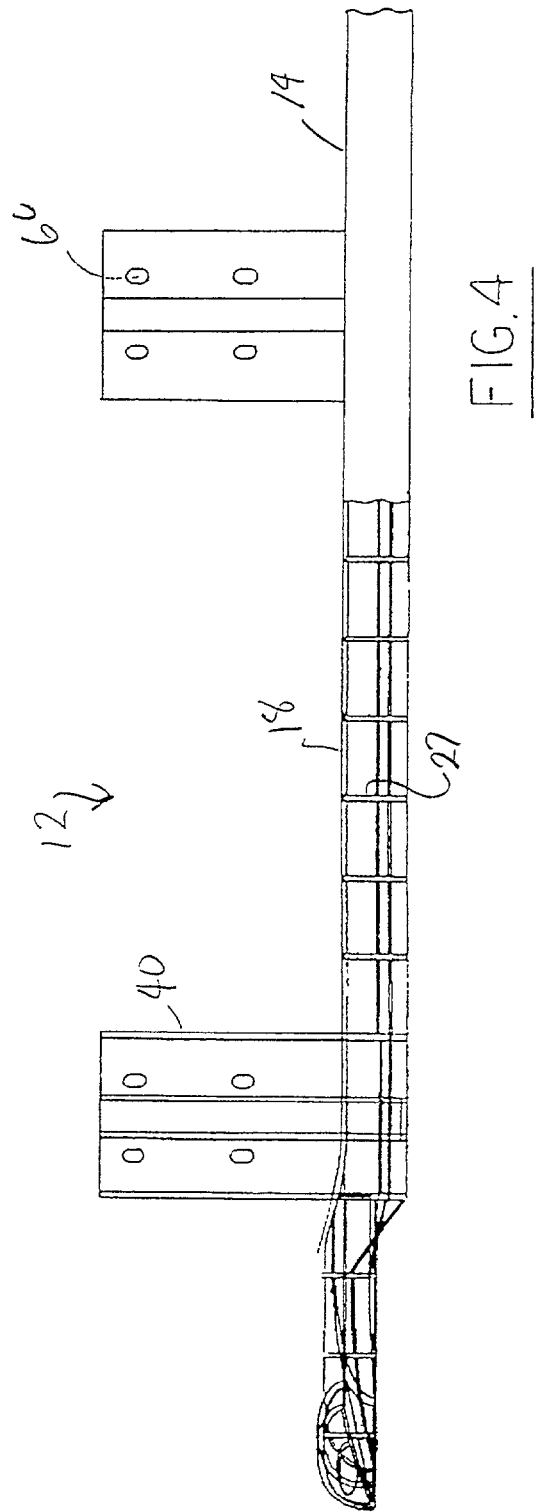

US 7,000,932 B2

AUTOMOTIVE VEHICLE POLYMERIC RUNNING BOARD

FIELD OF THE INVENTION

The present invention relates to running boards for automotive vehicles especially sport utility vehicles and light trucks, and more particularly, to polymeric molded running boards having integral polymeric support brackets.

BACKGROUND OF THE INVENTION

In the last two decades, many purchasers have turned from traditional cars, such as sedans and hatchbacks, choosing instead pick-up trucks or sport utility vehicles. Sport utility vehicles and light trucks traditionally have a higher clearance to allow the vehicle to have enhanced capabilities for off-road travel. Many vehicle purchasers also find that the higher vehicle floor is advantageous since it enhances the driver's field of vision.

Because of the higher clearance, many vehicles have what is referred to as a running board to provide a convenient step for individuals to utilize when entering and exiting the vehicle. Initially, most running boards consisted of an elongated tubular or channel metal member which was connected to a plurality of angled brackets. The brackets were in turn fixedly connected with the side rail of the vehicle.

In the most recent quarter century, a major technological effort has taken place to increase the fuel efficiency of automotive vehicles. One technical trend has been to address the fuel efficiency of the vehicle engine power plant. A second trend has been to improve the aerodynamic design of the vehicle to lower aerodynamic drag. A third trend has been to reduce the overall weight of the vehicle.

One way to reduce vehicular weight is to replace components of the vehicle which were previously provided by metals such as cast or stamped steel or aluminum, with polymeric materials. Not only do polymeric materials enhance the fuel efficiency of a vehicle by reducing its weight, but typically most polymeric materials are less susceptible to corrosive wear. In the past, polymeric running boards have been brought forth, however such running boards still require the utilization of metal brackets.

It is desirable to provide a running board wherein the platform as well as the support brackets can be fabricated from a lighter material.

It is desirable to bring forth a polymeric running board wherein the support brackets can also be fabricated from a polymeric material.

SUMMARY OF THE INVENTION

In a preferred embodiment, the present invention provides a running board for an automotive vehicle. The running board has a long, fiber-reinforced plastic platform to support the vehicle occupant's foot when entering or exiting the vehicle. The platform has a solid upper surface and generally perpendicular transverse webbing which is intercepted by longitudinal webbing for support of the solid upper surface.

The platform is supported by three spaced-apart J-shaped support brackets. The support brackets are also fabricated from long, fiber-reinforced plastic and are co-molded with the platform. The support brackets have an upper end which extends for connection to the vehicle and a lower end which extends laterally to connect to the platform. The support brackets have a triple channel configuration with the lateral sides of the channels extending into transverse webbing of the platform.

The running board of the present invention is advantageous over prior running boards in that it is lighter and easier to assemble, thus reducing assembly time and cost.

It is an object of the present invention to provide a polymeric running board for an automotive vehicle having integrally connected co-molded polymeric support brackets connected thereto.

Other advantages of the present invention will become more apparent to those skilled in the art as the invention is revealed in the accompanying drawings and detailed description.

BRIEF DESCRIPTION OF THE DRAWINGS

FIG. 1 is a perspective view of a sport utility vehicle utilizing the fiber-reinforced plastic polymeric running board with integral polymeric support brackets according to the present invention.

FIG. 2 is an enlarged perspective view of the running board shown in FIG. 1 being partially sectioned and removed from the vehicle for clarity of illustration.

FIG. 3 is a partially sectioned top plan view of the polymeric running board shown in FIG. 2.

FIG. 4 is a partially sectioned side elevational view of the running board shown in FIG. 3.

DETAILED DESCRIPTION OF THE INVENTION

Figure 5:
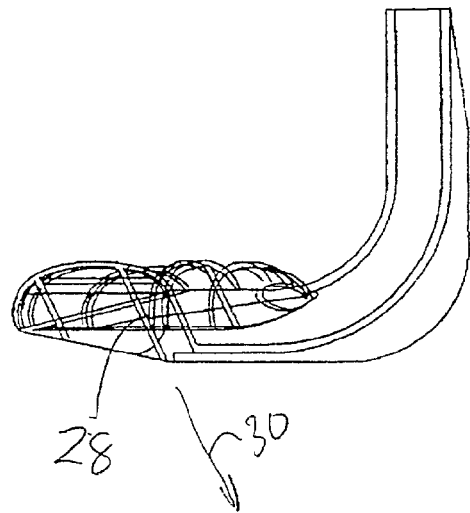
FIG. 5 is a partially sectioned front elevational view of the running board shown in FIG. 4.

FIG. 1 shows an automotive vehicle 5. The vehicle 5 has a lateral side 6 with side doors 8 and 10. Vehicle 5 is a sport utility vehicle, however the vehicle could be a light truck such as a pick-up truck. Connected to the lateral side 6 is a running board 12. The running board 12 provides a support step for individuals to utilize when entering or exiting the doors 8 or 10.

Turning to FIG. 2, the running board 12 has an elongated platform 14, that extends along the lateral side 6 of the vehicle. The platform 14 is molded from a special polymeric material such as polypropylene or other suitable alternatives reinforced by glass or polyester fibers. Preferably, the fibers will be equal or greater than 12 millimeters in length.

The platform 14 has an upper solid surface 18. The surface 18 provides the support for the vehicle occupant's foot. The surface 18 has a generally flat portion 20 which optionally rises up at its extreme ends 22. The platform has an outboard side wall 24 and an inboard side wall 26.

The upper solid surface 18 is reinforced by a series of transverse webs 27 (FIG. 3) which are generally perpendicular to the upper solid surface 18 (taken along a line running longitudinally along the upper solid surface 18). The transverse webs 27 are integrally formed with the upper solid surface.

The upper solid surface 18 is also reinforced by a series of longitudinal webs 28. Longitudinal webs 28 will be generally parallel with the draw line 30. Accordingly, the longitudinal webs 28 will intersect with the solid surface 18 at an angle.

Referring additionally to FIG. 5, longitudinal webs 28 are angled along line 30 which is generally the drawing angle of the running board 12. The drawing angle is typically between 0 and 150 degrees. Placing the webs at the inclined angle allows running board 12 to be manufactured in a single draw mold.

Typically, the thickness of the solid surface 18 will be 3 to 8 millimeters. The thickness of the transverse webs 27 will typically be 2 to 6 millimeters. The thickness of the outboard and inboard side walls 24, 26 will typically be 3 to 8 millimeters.

If desired, ribs 68 can be added to the solid surface 18 to provide greater friction with the pedal portion of the vehicle operator or occupant.

Turning again to FIG. 2, the running board 12 has two and preferably at least three polymeric support brackets 40 as determined by structural analysis and dependent on load requirements. The support brackets 40 are generally J-shaped having an upper end 42. The support bracket upper end 42 is provided for connection to the lateral side 6 of the vehicle. The support brackets 40 have a lower transversely extending end 44. The lower end 44 is integrally connected to the platform 14. The brackets 40 are co-molded with the platform 14.

The brackets 40 are a triple channel design having outer channels 48 and inner channels 50. The outer channels 48 open toward the vehicle 5. The thickness of the brackets 40 is between 3 and 8 millimeters. The outer channels 48 have a width that in the example shown is 110 to 130 percent of the width 52 of the juxtaposed inner channel 50.

The channels 48, 50 have lateral side walls 54 having a length 56 that generally increases between 18 and 25 percent along the bracket lower end 44. The brackets 40 have oblong fastener mounting holes 60 along an inboard side of the channels 48. The oblong nature of the fastener holes 60 provides for fine tune positional adjustment of the running board 12 on the vehicle 5. The channel lateral walls 54 are continuous with the transverse webs 27. In many instances the lateral walls 54 have the same thickness as the transverse webs 27.

Figure 6:
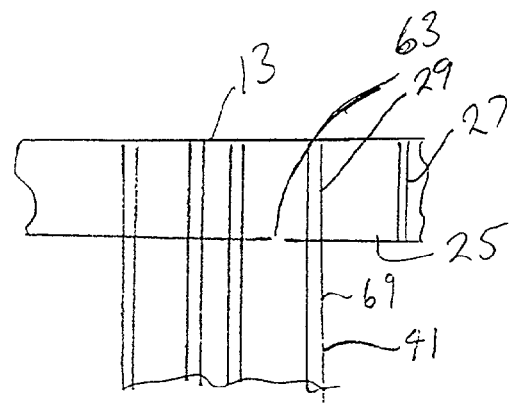
FIG. 6 is a partially sectioned view of a portion of an alternate preferred embodiment running board according to the present invention.

FIG. 6 shows an alternate preferred embodiment platform 13, which has transverse webs 27 as previously described. In an area adjacent to a support bracket 41, the side wall 69 of the bracket 41 has an increased thickness which extends inward to form transverse web 29. Additionally, interior side wall 25 has an aperture 63 to allow for drainage of precipitation.

Figure 7:
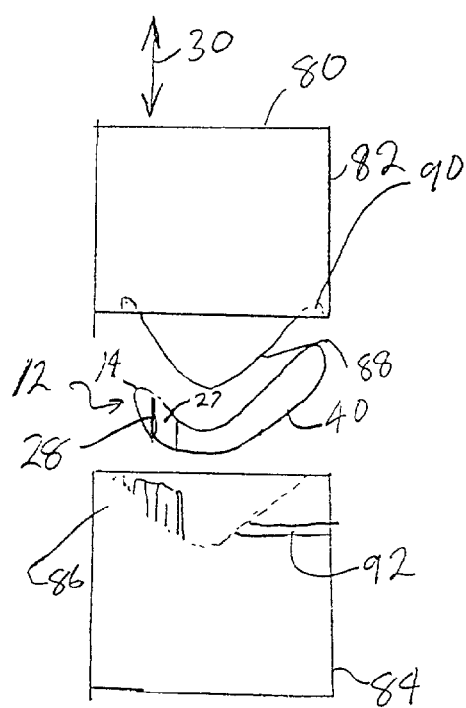
FIG. 7 is an operational view of a molding process utilized in producing a running board according to the present invention.

Referring to FIG. 7, a molding apparatus for the running board 12 is schematically shown. Mold 80 has an upper half 82 and lower half 84. The lower half 84 has a cavity 86. The upper half 82 has a mold form 88 which projects into the cavity 86 to provide the form for the running board 12.

The upper half 82 also has a cavity portion 90. The upper half 82 is moved vertically in the direction of draw line 30. Upon closure of the upper half 82 with the lower half 84, molten plastic is injected through injector line 92 to form the running board 12. The running board 12 will be formed with a platform 14 and a bracket 40.

As mentioned previously, the present invention provides a running board 12 wherein the platform 14 and support bracket are integrally connected. The integral running board and support brackets provide a 20% or greater weight advantage over a comparable metal running board and bracket assembly.

Although the present invention has been shown in a preferred embodiment, it will be obvious to those skilled in the art of the various modifications which can be made to the present invention without departing from the spirit or scope of the invention as it is defined by the following claims.

We claim:

1. A running board for an automotive vehicle comprising:
    a polymeric platform for supporting a vehicle occupant's pedal portion for entry or exit of a door of said vehicle, said platform being an elongated member extending along a lateral side of said vehicle; said platform having an upper solid surface reinforced with transverse webs underneath generally perpendicular to said upper solid surface; and
    at least first and second spaced apart polymeric support brackets, said brackets being generally J-shaped having an upper end for connection with said lateral side of said vehicle and said brackets having a lower end transversely extending and integrally connected with said platform and said brackets being co-molded therewith and wherein said brackets have a channel cross-sectional configuration comprising a plurality of channels being formed from a plurality of sidewalls with said sidewalls being continuous with said transverse webs of said platform, so that said lower end of said J-shaped bracket comprises said transverse webs, said channels being generally U-shaped in cross-section and extending uninterrupted from said lower end of said J-shaped bracket to said upper end of said J-shaped bracket.

2. A running board as described in claim 1, wherein said polymeric material is a plastic.

3. A running board as described in claim 2, wherein said plastic is polypropylene.

4. A running board as described in claim 2, wherein said plastic is a fiber reinforced plastic.

5. A running board as described in claim 4, wherein said fiber is taken from the group of polyester and fiberglass fibers.

6. A running board as described in claim 4, wherein said fiber is a long length of fiber.

7. A running board as described in claim 6, wherein said fiber is approximately 12 millimeters or greater in length.

8. A running board as described in claim 1, wherein said platform has longitudinal webs angled with respect to said upper solid surface.

9. A running board as described in claim 1, wherein said channel cross-sectional configuration comprises an inner channel and first and second outer channels.

10. A running board as described in claim 9, wherein said inner channel juxtaposes said first and second outer channels of said brackets, said first and second outer channels of said bracket being of larger width than said inner channel of said bracket.

11. A running board as described in claim 10, wherein said outer channels open toward said vehicle.

12. A running board as described in claim 9, wherein said platform has a sidewall with an aperture to allow for drainage of precipitation adjacent said support bracket.

13. A running board as described in claim 1, wherein said transverse webs of said platform that are continuous with said sidewalls of said J-shaped bracket have an increased thickness in comparison to said transverse webs that are not continuous with said sidewalls of said J-shaped bracket.

14. A running board for an automotive vehicle comprising:

a long fiber reinforced plastic platform for supporting a vehicle occupant's pedal portion for entry or exit of a side door of said vehicle, said platform being an elongated member extending generally along a lateral side of said vehicle, said platform having a generally upper solid surface reinforced by perpendicular transverse webs and angled longitudinal webs;

multiple long fiber-reinforced plastic polymeric support brackets, said brackets being generally J-shaped having an upper end for connection to said lateral side of said vehicle and a lower end transversely extended integrally connected with said platform and being co-molded therewith, said brackets being of a triple channel configuration and wherein said channels have lateral sides continuous with said transverse webs of said platform, so that said lower end of said J-shaped bracket comprises said transverse webs, said channels being generally U-shaped and extending uninterrupted from said lower end of said J-shaped bracket to said upper end of said J-shaped bracket and a middle channel having a smaller width than adjacent channels, said middle channel opening toward said platform.

15. A running board as described in claim 14, wherein said plastic is polypropylene.

16. A running board as described in claim 14, wherein said fibers are glass fibers approximately 12 millimeters or more in length.

* * * * *